United States Patent
Lee et al.

(10) Patent No.: US 10,821,834 B2
(45) Date of Patent: Nov. 3, 2020

(54) METHOD AND DEVICE FOR REGENERATIVE BRAKING OF TRANSPORTATION DEVICE

(71) Applicant: Samsung Electronics Co., Ltd., Suwon-si (KR)

(72) Inventors: Sun-Jae Lee, Hwaseong-si (KR); Young Hun Sung, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 238 days.

(21) Appl. No.: 15/976,951

(22) Filed: May 11, 2018

(65) Prior Publication Data

US 2019/0193567 A1    Jun. 27, 2019

(30) Foreign Application Priority Data

Dec. 26, 2017   (KR) .................. 10-2017-0179852

(51) Int. Cl.
| | |
|---|---|
| *B60L 7/18* | (2006.01) |
| *B60L 15/20* | (2006.01) |
| *B60T 7/04* | (2006.01) |
| *B60T 8/172* | (2006.01) |
| *B60T 7/22* | (2006.01) |
| *F16D 61/00* | (2006.01) |
| *B60T 1/10* | (2006.01) |

(52) U.S. Cl.
CPC ............ *B60L 7/18* (2013.01); *B60L 15/2009* (2013.01); *B60T 1/10* (2013.01); *B60T 7/042* (2013.01); *B60T 7/22* (2013.01); *B60T 8/172* (2013.01); *F16D 61/00* (2013.01); *B60L 2240/16* (2013.01); *B60L 2240/423* (2013.01); *B60L 2250/26* (2013.01); *B60T 2201/022* (2013.01); *B60T 2220/04* (2013.01); *B60T 2270/60* (2013.01); *B60T 2270/611* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 5,941,918 | A * | 8/1999 | Blosser ................... | F01N 11/00 701/31.7 |
| 6,523,626 | B2 | 2/2003 | Wakashiro et al. | |
| 6,553,301 | B1 * | 4/2003 | Chhaya ................... | B60K 6/54 701/54 |
| 2011/0023772 | A1 * | 2/2011 | Crombez ............... | B60K 6/445 116/28 R |
| 2012/0139329 | A1 * | 6/2012 | Fabini ...................... | B60L 7/10 303/3 |

(Continued)

FOREIGN PATENT DOCUMENTS

| | | |
|---|---|---|
| JP | 5932596 B2 | 6/2016 |
| KR | 10-0867795 B1 | 11/2008 |

(Continued)

*Primary Examiner* — Anshul Sood
(74) *Attorney, Agent, or Firm* — NSIP Law

(57) ABSTRACT

Provided are a regenerative braking method and device for a transportation device. A regenerative braking method through adaptation to a driving habit includes accumulating a deceleration level of a driver, determining a regenerative braking level based on the accumulated deceleration level, and controlling a torque of a motor based on the regenerative braking level.

18 Claims, 9 Drawing Sheets

(56) References Cited

U.S. PATENT DOCUMENTS

| | | | |
|---|---|---|---|
| 2013/0345913 A1* | 12/2013 | Krueger | B60T 1/10 701/22 |
| 2015/0019058 A1* | 1/2015 | Georgiev | B60L 7/18 701/22 |
| 2017/0015202 A1* | 1/2017 | Bryan | B60L 53/00 |

FOREIGN PATENT DOCUMENTS

| | | |
|---|---|---|
| KR | 10-1283075 B1 | 7/2013 |
| KR | 10-1440176 B1 | 9/2014 |
| KR | 10-2017-0079022 A | 7/2017 |
| KR | 10-1777329 B1 | 9/2017 |

* cited by examiner

10

METHOD AND DEVICE FOR REGENERATIVE BRAKING OF TRANSPORTATION DEVICE

CROSS-REFERENCE TO RELATED APPLICATIONS

This application claims the benefit under 35 USC § 119(a) of Korean Patent Application No. 10-2017-0179852 filed on Dec. 26, 2017 in the Korean Intellectual Property Office, the entire disclosure of which is incorporated herein by reference for all purposes.

BACKGROUND

1. Field

The following description relates to a regenerative braking method and device of a transportation device.

2. Description of Related Art

With the rising environmental and energy resource issues, hybrid vehicle and electric vehicle are gaining popularity as future vehicles. The hybrid vehicle and the electric vehicle may use a battery pack including a plurality of secondary batteries capable for charging and discharging as a main power source.

Accordingly, compared to other types of vehicles, a lifetime of the battery pack is very important for the hybrid vehicle or the electric vehicle and efforts to extend the lifetime of the battery pack are been conducted. For example, providing a large capacity battery pack to a vehicle or a method of charging a vehicle using another vehicle equipped with a generator, are proposed.

Electric vehicles are equipped with a large-capacity battery pack to ensure long mileage. The latest electric vehicles are also equipped with larger capacity battery packs for extended mileage.

To increase the distance the vehicle may travel, it may be desirable to increase the capacity of a battery pack. However, if the capacity of the battery pack is increased, it may increase cost of the battery pack and a weight of a vehicle. In addition, charging of the battery pack may become an issue. A battery pack with a large capacity may be used only after charging for a long time.

To alleviate the charging issue and to increase the mileage, the electric vehicle uses regenerative braking based on characteristics of a motor that is a driving source. Regenerative braking refers to technology for converting kinetic energy that is discarded during deceleration and braking to electric energy through the motor and charging a battery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a regenerative braking method through adaptation to a driving habit, the method including accumulating a deceleration level of a driver, determining a regenerative braking level based on the accumulated deceleration level, and controlling a torque of a motor based on the regenerative braking level.

The accumulating may include accumulating the deceleration level using a histogram.

The determining of the regenerative braking level may include determining the regenerative braking level based on the most frequently accumulated deceleration level on the histogram.

The method may include displaying the histogram.

The accumulating may include accumulating a deceleration amount from when the driver starts decelerating and until the driver stops.

The deceleration amount may include a surface area of a deceleration area when a change in a driving speed of the driver may be plotted with respect to a movement distance on a graph.

The accumulating may include determining a brake level at which the driver steps on a brake, and accumulating the brake level until the driver starts decelerating and stops.

The method of claim 7, wherein the brake level may be determined based on a distance moved by the brake, in response to stepping on the brake.

The brake level may be determined based on an angle of the brake.

The angle of the brake may include an angle formed between an initial position of the brake and a final position of the brake.

The determining of the regenerative braking level may include determining the regenerative braking level based on the accumulated deceleration level and an obstacle in a path of the driver.

In another general aspect, there is provided a device for regenerative braking through adaptation to a driving habit, the device including a vehicle control unit (VCU) configured to accumulate a deceleration level of a driver, and to determine a regenerative braking level based on the accumulated deceleration level, and a transmission control unit (TCU) configured to control a torque of a motor based on the regenerative braking level.

The VCU may be configured to accumulate the deceleration level using a histogram.

The device may include a display configured to display the histogram.

The VCU may be configured to accumulate a deceleration amount from when the driver starts decelerating and until the driver stops.

The deceleration amount may be a surface area of a deceleration area when a change in a driving speed of the driver may be plotted with respect to a movement distance on a graph.

The VCU may be configured to determine a brake level at which the driver steps on a brake, and to accumulate the brake level until the driver starts decelerating and stops.

The brake level may be determined based on a distance moved by the brake, in response to stepping on the brake.

The brake level may be determined based on an angle of the brake.

Other features and aspects will be apparent from the following detailed description, the drawings, and the claims.

Figure 1:
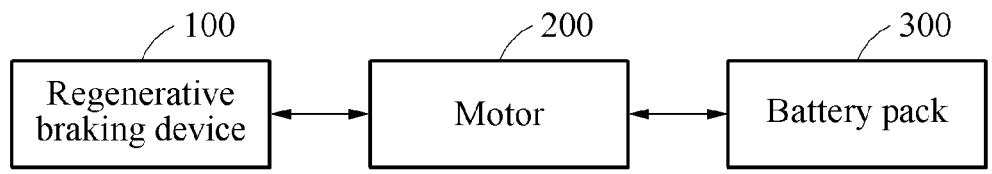
FIG. 1 illustrates an example of a regenerative braking apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), and (b) may be used herein to describe components. However, such terms are not used to define an essence, order, or sequence of a corresponding component, but are used merely to distinguish the corresponding component from other components. For example, a component referred to as a first component may be referred to instead as a second component, and another component referred to as a second component may be referred to instead as a first component.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only, and is not intended to limit the disclosure or claims. The singular forms "a," "an," and "the" include the plural forms as well, unless the context clearly indicates otherwise.

Hereinafter, the examples are described with reference to the accompanying drawings. However, the scope of the examples is not limited thereto or restricted thereby. Like reference numerals refer to like elements throughout although they are illustrated in different drawings.

Figure 2:
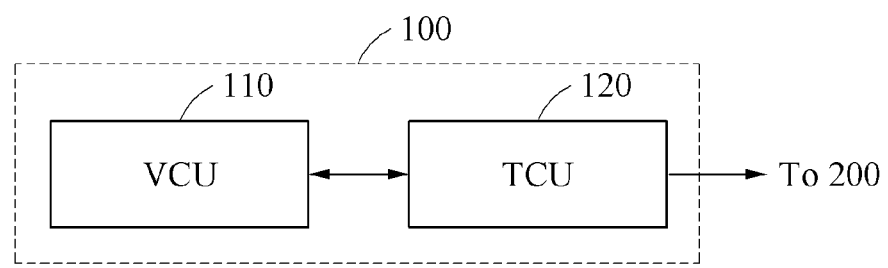
FIG. 2 illustrates an example of a regenerative braking device of FIG. 1.

FIG. 1 illustrates an example of a regenerative braking apparatus, and FIG. 2 illustrates an example of a regenerative braking device of FIG. 1.

Referring to FIGS. 1 and 2, a regenerative braking apparatus 10 includes a regenerative braking device 100, a motor 200, and a battery pack 300.

The regenerative braking apparatus 10 may be configured in a transportation device that is driven with electricity.

The transportation device described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, a smart mobility, a plug-in hybrid vehicle, or a drone. The smart mobility may include mobility devices such as, for example, electric wheels, an electric kickboard, an electric bike, and a motorcycle.

The regenerative braking apparatus 10 charges the battery pack 300 using regenerative braking. The regenerative braking apparatus 10 charges the battery pack 300 by using the motor 200 as a power generator when the transportation device is decelerated.

In an example, the regenerative braking device 100 performs regenerative braking through optimal adaptation to a driving habit of a driver. Referring to FIG. 2, the regenerative braking device 100 includes a vehicle control unit (VCU) 110 and a transmission control unit (TCU) 120.

In an example, the VCU 110 accumulates a deceleration level of the driver and determines a regenerative braking level based on the accumulated deceleration level. In an example, the VCU 110 accumulates a deceleration amount from when the the driver starts decelerating and until when the driver stops.

In an example, the deceleration level refers to a deceleration amount or a brake level. For example, if a driving speed of the driver is plotted with respect to a distance in a graph, the deceleration amount indicates a surface area of a deceleration area when a change in a driving speed of the driver with respect to a movement distance is represented using a graph. Also, the brake level may be determined based on a brake distance, i.e., a distance that is moved in response to stepping on a brake for deceleration or a brake angle at which the driver steps on the brake for deceleration.

In an example, the VCU 110 determines a regenerative braking level corresponding to a most frequently accumulated deceleration level. In an example, the VCU 110 accumulates the deceleration level using a histogram.

Also, the VCU 110 may determine the regenerative braking level by further considering a distance from an obstacle present ahead of the transportation device. For example, if a distance between the transportation device and the obstacle is relatively close, the VCU 110 may increase the regenerative braking level. If the distance between the transportation device and the obstacle is relatively far, the VCU 110 may decrease the regenerative braking level.

The TCU 120 determines a torque of the motor 200 based on the regenerative braking level. Here, the motor 200 charges the battery pack 300 by performing regenerative braking based on the determined torque. By maintaining a charge amount of the battery pack 300 to be maximal through optimal adaptation to a driving habit of the driver, a movable distance of the transportation device may significantly increase.

The battery pack 300 may include a plurality of battery modules. Each of the battery modules may include a plurality of cells.

Figure 3:
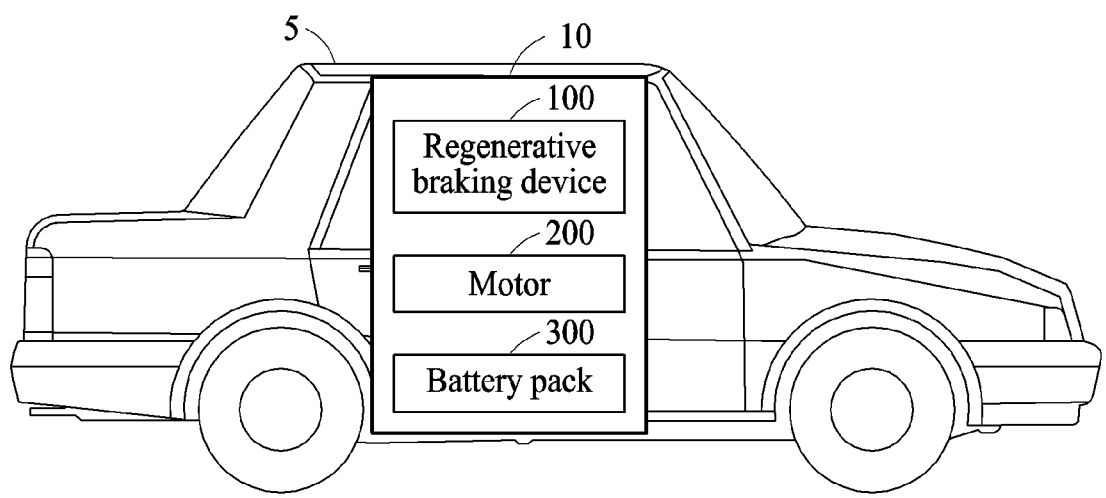
FIG. 3 illustrates an example of describing a regenerative braking apparatus.
Figure 4:
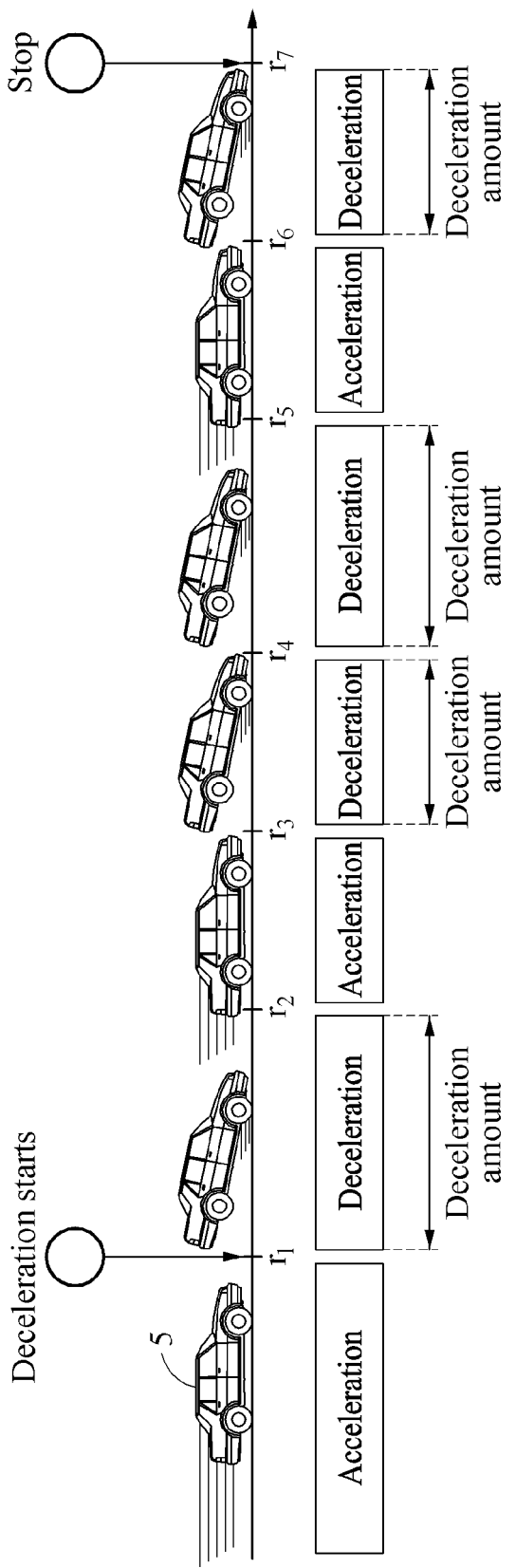
FIG. 4 illustrates an example of describing a driving of a vehicle to which the regenerative braking apparatus of FIG. 3 is applied.
Figure 5:
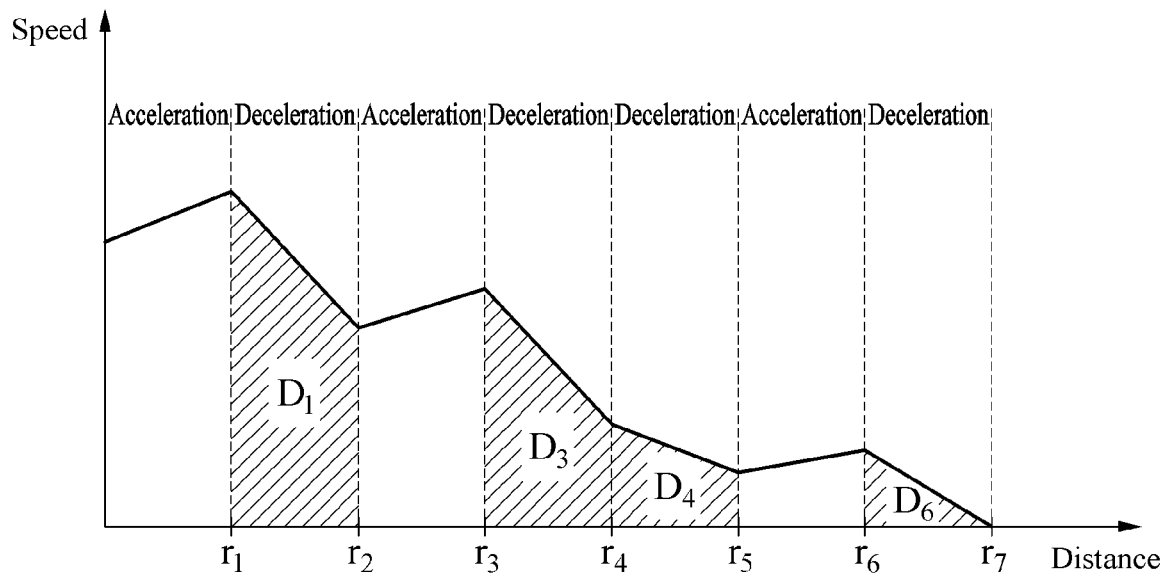
FIG. 5 is a graph illustrating an example of describing a driving of a vehicle to which the regenerative braking apparatus of FIG. 3 is applied.
Figure 6:
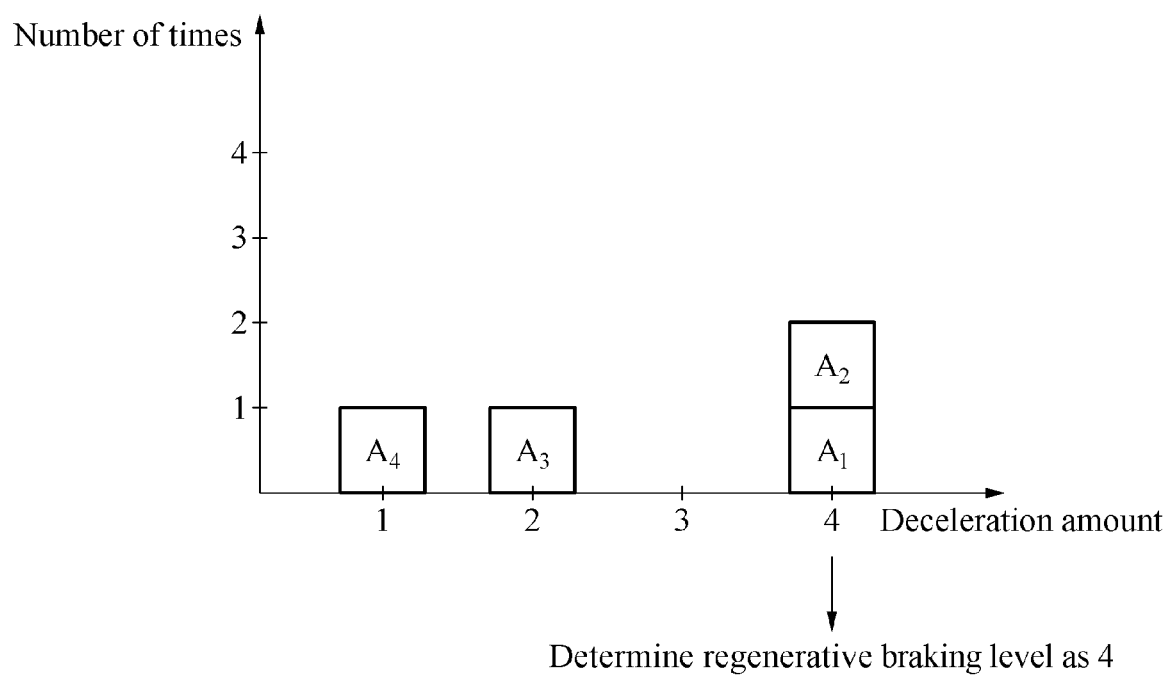
FIG. 6 is a graph illustrating an example of describing an operation of a vehicle control unit.

FIG. 3 illustrates an example of describing a regenerative braking apparatus, FIG. 4 illustrates an example of describing a driving of a vehicle to which the regenerative braking apparatus of FIG. 3 is applied, FIG. 5 is a graph illustrating an example of describing a driving of a vehicle to which the regenerative braking apparatus of FIG. 3 is applied, and FIG. 6 is a graph illustrating an example of describing an operation of a VCU.

Referring to FIGS. 3 through 6, a vehicle 5 is illustrated. The vehicle 5 may be, for example, an electric vehicle, a hybrid vehicle, a plug-in hybrid vehicle, or any of the other transportation devices described above. The regenerative braking apparatus 10 may be configured in the vehicle 5. The regenerative braking apparatus 10 includes the regenerative braking device 100, the motor 200, and the battery pack 300. A configuration and an operation of the regenerative braking apparatus 10 of FIG. 3 may be substantially identical to those of the regenerative braking apparatus 10 of FIG. 1.

The vehicle 5 speeds up to a point $r_1$, and starts reducing the speed from $r_1$. The vehicle 5 reduces a speed from the point $r_1$ to a point $r_2$. The vehicle 5 increases a speed from the point $r_2$ to a point $r_3$. The vehicle 5 reduces a speed from the point $r_3$ to a point $r_4$. The vehicle 5 reduces a speed from the point $r_4$ to a point $r_5$. In an example, a deceleration amount of the vehicle 5 from the point $r_4$ to the point $r_5$ may be less than that of the vehicle 5 from the point $r_3$ to the $r_4$. The vehicle 5 increases a speed from the point $r_5$ to a point $r_6$. The vehicle 5 reduces a speed from the point $r_6$ to a point $r_7$. The vehicle 5 stops at the point $r_7$.

The VCU of the regenerative braking device 100 may accumulate a deceleration level of the vehicle 5. Referring to FIGS. 4 through 6, a deceleration level may refer to a deceleration amount. Referring to FIG. 5, the deceleration amount may indicate an area of a deceleration speed and a deceleration distance when the speed of the vehicle 5 with respect to the distance is represented using a graph. The deceleration amount may refer to a surface area of a deceleration area when a change in the driving speed of the driver with respect to a movement distance is represented using the graph.

When the vehicle 5 decelerates, the VCU may calculate a deceleration amount and may accumulate the deceleration amount for each size. In an example, the VCU classifies the size of the deceleration amount into four types including a first stage, a second stage, a third stage, and a fourth stage, and may accumulate the deceleration amount based on the classified four types. If the size of the deceleration amount is relatively small, it corresponds to the first stage. If the size of the deceleration amount is relatively great, it corresponds to the fourth stage. In an example, the VCU may accumulate the deceleration amount using the histogram.

If the vehicle 5 decelerates from the point $r_1$ to the $r_2$, the VCU may calculate a deceleration amount $D_1$ and may accumulate the calculated deceleration amount $D_1$ as $A_1$ in the fourth stage. If the vehicle 5 decelerates from the point $r_3$ to the point $r_4$, the VCU may calculate a deceleration amount $D_3$ and may accumulate the calculated deceleration amount $D_3$ as $A_2$ in the fourth stage. If the vehicle 5 decelerates from the point $r_4$ to the point of $r_5$, the VCU may calculate a deceleration amount $D_4$ and may accumulate the calculated deceleration amount $D_4$ as $A_3$ in the second stage. If the vehicle 5 decelerates from the point $r_6$ to the point $r_7$, the VCU may calculate a deceleration amount $D_6$ and may accumulate the calculated deceleration amount $D_6$ as $A_4$ in the first stage.

The VCU may determine a regenerative braking level based on the deceleration amount. The VCU may classify the regenerative braking level based on a number of types of the size of the deceleration amount. In an example, the VCU may classify the regenerative braking level into four types from first to fourth stages.

The regenerative braking level may correspond to the deceleration amount. If a regenerative braking torque is relatively small, the regenerative braking level may correspond to the first stage. If the regenerative braking torque is relatively great, the regenerative braking level may correspond to the fourth stage. The smaller the deceleration amount, the less frequently regenerative braking may occur. The greater the deceleration amount, the more frequently regenerative braking may occur.

In an example, the VCU determines the regenerative braking level as the fourth stage based on the deceleration amount that is most frequently accumulated in the fourth stage. Accordingly, the TCU of the regenerative braking device 100 may determine the torque of the motor 200 based on the regenerative braking level. According to an increase in the regenerative braking level, the motor 200 may increase the torque being used for regenerative braking and may quickly decelerate. The motor 200 may charge the battery pack 300 by performing regenerative braking based on the determined torque.

Although FIG. 6 is described based on an example in which the size of the deceleration amount and the regenerative braking level are classified into four types for clarity of description, it is provided as an example only. The number of types of regenerative braking level can be varied without departing from the spirit and scope of the illustrative examples described.

Figure 7A:
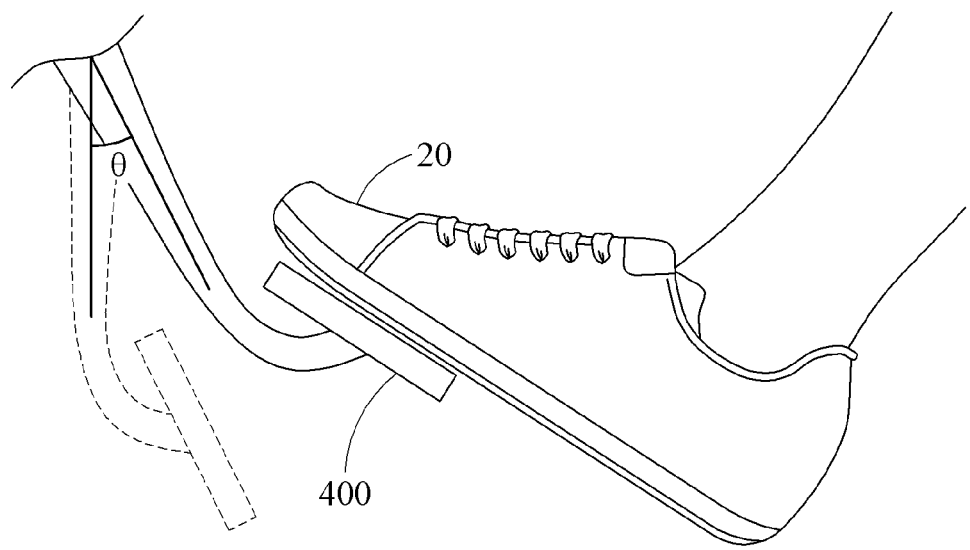
FIG. 7A illustrates an example of describing a brake level.
Figure 7B:
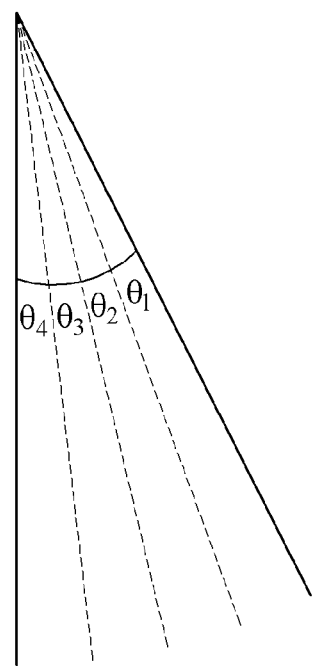
FIG. 7B illustrates another example of describing a brake level.
Figure 7C:
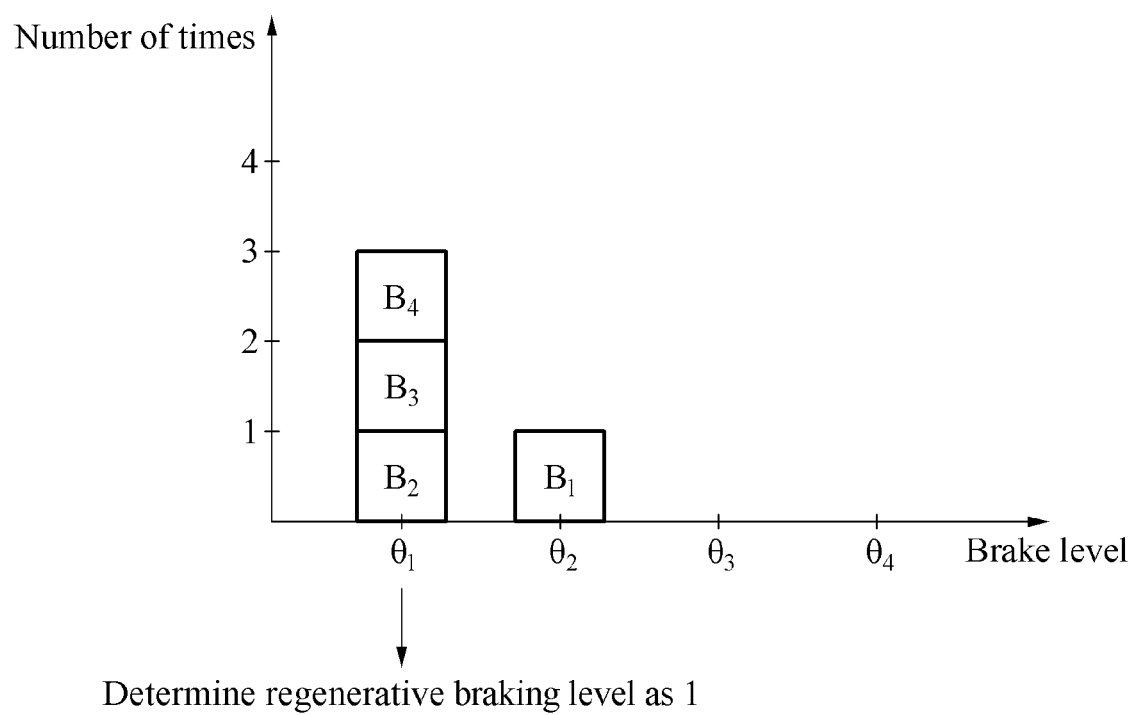
FIG. 7C is a graph illustrating an example of describing an operation of a vehicle control unit.

FIG. 7A illustrates an example of describing a brake level, FIG. 7B illustrates another example of describing a brake level, and FIG. 7C is a graph illustrating an example of describing an operation of a VCU.

Referring to FIGS. 7A through 7C, a deceleration level may refer to a brake level. In an example, the brake level is determined based on a brake angle.

A driver may decelerate by stepping on a brake 400 with a foot 20 of the driver. The brake 400 may move by an angle $\theta$ with a force applied from the foot 20.

A VCU of a regenerative braking device may classify the angle $\theta$ within which the brake 400 is allowed to move into four types of angle areas, for example, areas $\theta_1$, $\theta_2$, $\theta_3$, and $\theta_4$. For example, the VCU may equally divide the angle $\theta$ into four areas. The VCU may accumulate a level that is represented as an angle and at which the driver steps on the brake 400. That is, the VCU may determine an angle area in which the brake 400 is located among the areas $\theta_1$, $\theta_2$, $\theta_3$, and $\theta_4$, and may accumulate the brake level in the determined angle area.

For example, the driver may perform deceleration by stepping on the brake 400 up to the area $\theta_2$ during accelerating. Referring to FIG. 7C, the VCU may accumulate the brake level as $B_1$ in the area $\theta_2$.

The driver may perform deceleration by stepping on the brake 400 consecutively three times up to the area $\theta_1$. Referring to FIG. 7C, the VCU may accumulate the brake level as $B_1$ in the area $\theta_2$. The driver may perform deceleration by consecutively stepping on the brake 400 up to the area $\theta_1$. Referring to FIG. 7C, the VCU may accumulate the brake level as $B_2$, $B_3$, and $B_4$ in the area $\theta_1$.

The VCU may determine a regenerative braking level based on the brake level. The VCU may classify the regenerative braking level based on a number of types of the brake level. For example, the VCU may classify the regenerative braking level into four types from first to fourth stages. However, the number of types of regenerative braking level can be varied without departing from the spirit and scope of the illustrative examples described.

The regenerative braking level may correspond to the brake level. If the driver weakly steps on the brake 400 and the brake level corresponds to the area $\theta_1$, i.e., if a regenerative braking torque is relatively small, the regenerative braking level may correspond to the first stage. If the driver strongly steps on the brake 400 and the brake level corresponds to the area $\theta_4$, i.e., if the regenerative braking torque is relatively great, the regenerative braking level may correspond to the fourth stage. Thus, the smaller the brake level is, the less frequently regenerative braking may occur. The greater the brake level, the more frequently regenerative braking may occur.

The VCU may determine the regenerative braking level as the first stage based on the brake level that is most frequently accumulated in the area $\theta_1$. Accordingly, a TCU of the regenerative braking device may determine a torque of a motor based on the regenerative braking level. According to a decrease in the regenerative braking level, the motor may slowly reduce a speed of a transportation device by decreasing the torque being used for regenerative braking. The motor may charge a battery pack by performing regenerative braking based on the determined torque.

Although FIGS. 7A through 7C are described based on an example in which the brake angle and the regenerative braking level are classified into four types for clarity of description, it is provided as an example only. However, the number of types of regenerative braking level can be varied without departing from the spirit and scope of the illustrative examples described.

Figure 8A:
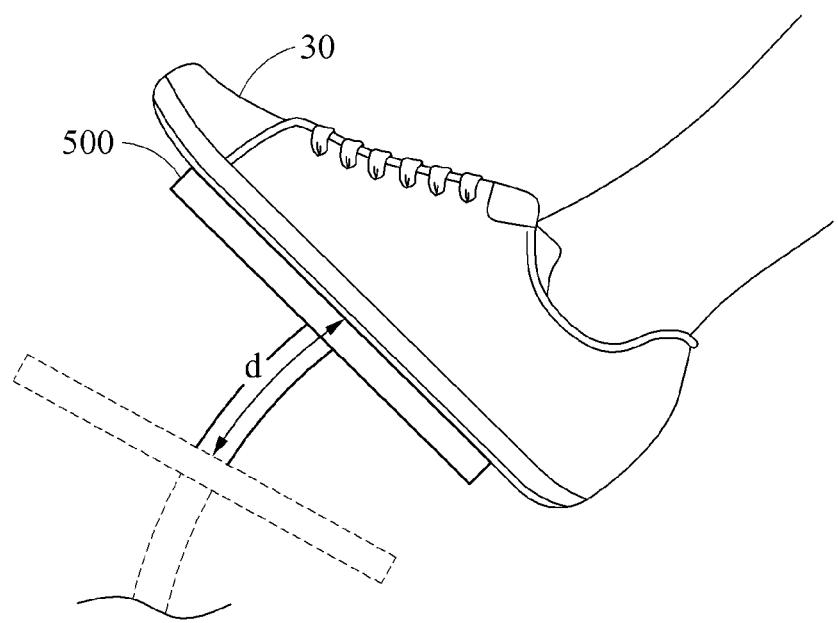
FIG. 8A illustrates an example of describing a brake level.
Figure 8B:
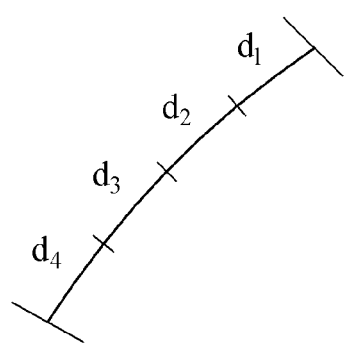
FIG. 8B illustrates another example of describing a brake level.
Figure 8C:
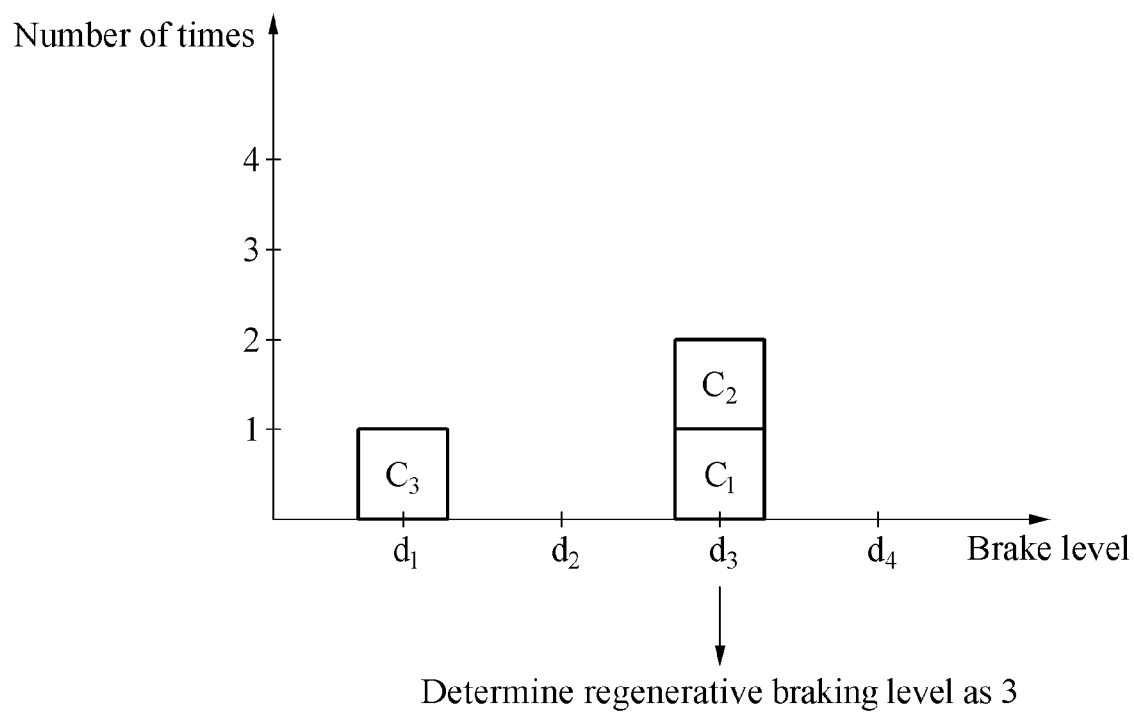
FIG. 8C is a graph illustrating an example of describing an operation of a vehicle control unit.

FIG. 8A illustrates an example of describing a brake level, FIG. 8B illustrates another example of describing a brake level, and FIG. 8C is a graph illustrating an example of describing an operation of a VCU.

Referring to FIGS. 8A through 8C, a deceleration level may refer to a brake level. In an example, the brake level is determined based on a brake distance.

A driver may decelerate by stepping on a brake 500 with a foot 30 of the driver. The brake 500 may move by a distance d when a force is applied from the foot 30.

A VCU of a regenerative braking device may classify the distance d within which the brake 500 is allowed to move into four types of distance areas, for example, areas $d_1$, $d_2$, $d_3$, and $d_4$. For example, the VCU may equally divide the distance d into four areas. The VCU may accumulate a level that is represented as a distance and at which the driver steps on the brake 500. That is, the VCU may determine a distance area in which the brake 500 is located among the areas $d_1$, $d_2$, $d_3$, and $d_4$, and may accumulate the brake level in the determined distance area.

For example, the driver may perform deceleration by stepping on the brake 500 consecutively twice up to the area $d_3$ during accelerating. Referring to FIG. 8C, the VCU may accumulate the brake level as $C_1$ and $C_2$ in the area $d_3$.

The driver may perform deceleration by stepping on the brake 500 up to the area $d_1$. Referring to FIG. 8C, the VCU may accumulate the brake level as $C_3$ in the area $d_1$.

The VCU may determine a regenerative braking level based on the brake level. The VCU may classify the regenerative braking level based on a number of types of the brake level. For example, the VCU may classify the regenerative braking level into four types from first to fourth stages.

The regenerative braking level may correspond to the brake level. If the driver weakly steps on the brake 500 and the brake level corresponds to the area $d_1$, i.e., if a regenerative braking torque is relatively small, the regenerative braking level may correspond to the first stage. If the driver strongly steps on the brake 500 and the brake level corresponds to the area $d_4$, i.e., if the regenerative braking torque is relatively great, the regenerative braking level may correspond to the fourth stage. Thus, the smaller the brake level is, the less frequently regenerative braking may occur. The greater the brake level, the more frequently regenerative braking may occur.

The VCU may determine the regenerative braking level as the third stage based on the brake level that is most frequently accumulated in the area $d_3$. Accordingly, a TCU of the regenerative braking device may determine a torque of a motor based on the regenerative braking level. According to an increase in the regenerative braking level, the motor may quickly reduce a speed of a transportation device by increasing the torque being used for regenerative braking. The motor may charge a battery pack by performing regenerative braking based on the determined torque.

Although FIGS. 8A through 8C are described based on an example in which the brake distance and the regenerative braking level are classified into four types for clarity of description, it is provided as an example only. The number of types of regenerative braking level can be varied without departing from the spirit and scope of the illustrative examples described.

Figure 9:
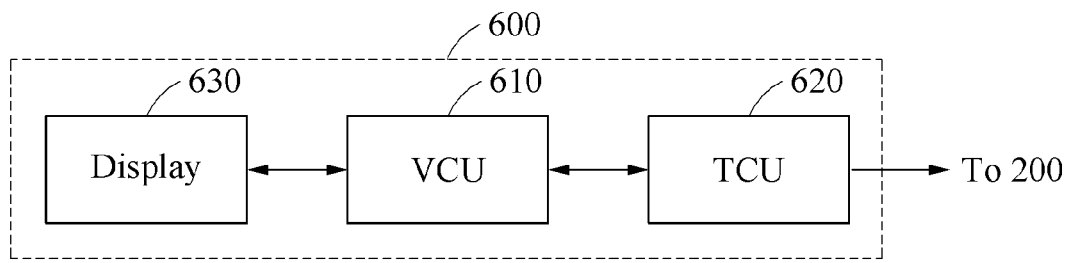
FIG. 9 illustrates another example of a regenerative braking device.

FIG. 9 illustrates another example of a regenerative braking device.

Referring to FIG. 9, a regenerative braking device 600 includes a VCU 610, a TCU 620, and a display 630. Configurations and operations of the VCU 610 and the TCU 620 of FIG. 9 may be substantially identical to those of the VCU 110 and the TCU 120 of FIG. 2. Hereinafter, configurations and operations distinguished from those of FIG. 2 will be described.

The display 630 displays a deceleration level accumulated by the VCU 610. For example, the display 630 displays a histogram showing the accumulated deceleration level. The deceleration level may refer to a deceleration amount or a brake level. A driver may verify a driving habit of the driver based on the deceleration level displayed on the display 630. For example, the driver may verify the driving habit, such as, whether the driver frequently brakes or suddenly brakes, and the like.

The display 630 displays a regenerative braking level. The driver may verify a progress state of regenerative braking currently occurring in a vehicle based on the regenerative braking level displayed on the display 630. For example, if a regenerative braking torque is relatively great, the driver may verify that a deceleration amount is great and may step on the brake later. If the regenerative braking torque is relatively small, the driver may verify that the deceleration amount is small and may step on the brake in advance.

In an example, the display 630 is a head-up display (HUD) included in the transportation device. In an example, the regenerative braking level is displayed on the HUD installed for driving assistance in a transportation device or a fully autonomous driving system to assist safe and comfortable driving. However, the displaying of the image is not limited to the example described in the forgoing, and any other instrument cluster, vehicular infotainment system, screen in the vehicle that uses augmented reality, or display panel in the vehicle may perform the display function. Other displays, such as, for example, smart phone and eye glass display (EGD) that are operatively connected to the regenerative braking device 100 may be used without departing from the spirit and scope of the illustrative examples described.

Figure 10:
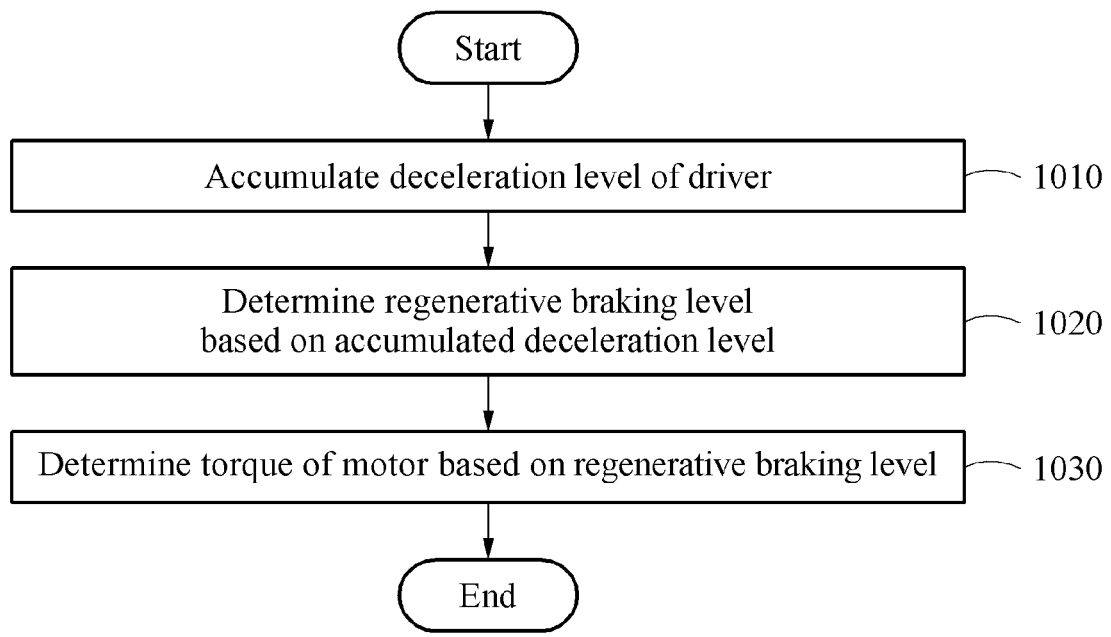
FIG. 10 is a diagram illustrating an example of a method of regenerative braking.

FIG. 10 is a diagram illustrating an example of a regenerating braking method. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

Referring to FIG. 10, in operation 1010, a regenerative braking device accumulates a deceleration level of the driver. Here, the deceleration level may refer to a deceleration amount or a brake level. For example, if a driving speed of the driver with respect to a distance is represented using a graph, the deceleration level may indicate a surface area of a deceleration area when a change in a driving speed of the driver with respect to a movement distance is represented using a graph. Also, the brake level may be determined based on a brake distance, i.e., a distance that is moved in response to stepping on a brake for deceleration or a brake angle at which the driver steps on the brake for deceleration.

In operation 1020, the regenerative braking device determines a regenerative braking level based on the accumulated deceleration level. The regenerative braking level may correspond to the deceleration level. For example, if the deceleration is classified into five types from a first stage to a fifth stage, the regenerative braking level may be classified into five types from the first stage to the fifth stage. If the deceleration level is most frequently accumulated in the first stage, the regenerative braking device may determine the regenerative braking level as the first stage.

In operation 1030, the regenerative braking device determines a torque of a motor based on the regenerative braking level. The regenerative braking device may quickly reduce a speed of a transportation device by increasing the torque being used at the motor for regenerative braking according to an increase in the regenerative braking level. The regenerative braking device may slowly reduce the speed of the transportation device by decreasing the torque being used at the motor for regenerative braking according to a decrease in the regenerative braking level.

According to examples, a movable distance of a transportation device may significantly increase by maintaining a charge amount of a battery pack to be maximal through optimal adaptation to a driving habit of a driver.

The regenerative braking devices, regenerative braking apparatus 10, regenerative braking device 100, vehicle control unit (VCU) 110, transmission control unit (TCU) 120, regenerative braking device 600, VCU 610, TCU 620, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated herein that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A regenerative braking method through adaptation to a driving habit, the method comprising:
    accumulating a deceleration level of a driver of a vehicle;
    determining a regenerative braking level based on the accumulated deceleration level; and
    controlling a torque of a motor based on the regenerative braking level,
    wherein the accumulating comprises accumulating a number of times of classified deceleration amount in the form of histogram.

2. The method of claim 1, wherein the determining of the regenerative braking level comprises determining the regenerative braking level based on a most frequently accumulated deceleration level on the histogram.

3. The method of claim 1, further comprising:
    displaying the histogram.

4. The method of claim 1, wherein the accumulating comprises accumulating a deceleration amount from when the vehicle starts decelerating and until the vehicle stops.

5. The method of claim 4, wherein the deceleration amount is an area under plotted curve of a graph when a change in a driving speed of the driver is plotted with respect to a movement distance on the graph.

6. The method of claim 1, wherein the accumulating comprises:
    determining a brake level at which the driver steps on a brake pedal; and
    accumulating the brake level until the vehicle starts decelerating and stops.

7. The method of claim 6, wherein the brake level is determined based on a distance moved by the brake pedal, in response to stepping on the brake pedal.

8. The method of claim 6, wherein the brake level is determined based on an angle of the brake pedal.

9. The method of claim 6, wherein the angle of the brake comprises an angle formed between an initial position of the brake pedal and a final position of the brake pedal.

10. The method of claim 1, wherein the determining of the regenerative braking level comprises determining the regenerative braking level based on the accumulated deceleration level and an obstacle in a path of the driver.

11. A non-transitory computer-readable storage medium storing instructions that, when executed by a processor, cause the processor to perform the regenerative braking method of claim 1.

12. A device for regenerative braking through adaptation to a driving habit, the device comprising:
a vehicle control unit (VCU) configured to accumulate a deceleration level of a driver of a vehicle, and to determine a regenerative braking level based on the accumulated deceleration level; and
a transmission control unit (TCU) configured to control a torque of a motor based on the regenerative braking level,
wherein the VCU is further configured to accumulate a number of times of classified deceleration amount in the form of histogram.

13. The device of claim 12, further comprising:
a display configured to display the histogram.

14. The device of claim 12, wherein the VCU is further configured to accumulate a deceleration amount from when the vehicle starts decelerating and until the vehicle stops.

15. The device of claim 14, wherein the deceleration amount is an area under plotted curve of a graph when a change in a driving speed of the driver is plotted with respect to a movement distance on the graph.

16. The device of claim 12, wherein the VCU is further configured to determine a brake level at which the driver steps on a brake pedal, and to accumulate the brake level until the vehicle starts decelerating and stops.

17. The device of claim 16, wherein the brake level is determined based on a distance moved by the brake pedal, in response to stepping on the brake pedal.

18. The device of claim 16, wherein the brake level is determined based on an angle of the brake pedal.

* * * * *